(12) United States Patent
Osada

(10) Patent No.: US 10,831,423 B2
(45) Date of Patent: Nov. 10, 2020

(54) INFORMATION PROCESSING APPARATUS THAT SEARCHES FOR COMMUNICATION APPARATUS VIA NETWORK, STORAGE MEDIUM THAT STORES PROGRAM EXECUTED BY THE INFORMATION PROCESSING APPARATUS, AND CONTROL METHOD FOR THE INFORMATION PROCESSING APPARATUS

(71) Applicant: CANON KABUSHIKI KAISHA, Tokyo (JP)

(72) Inventor: Tomoaki Osada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/373,491

(22) Filed: Apr. 2, 2019

(65) Prior Publication Data
US 2019/0317706 A1    Oct. 17, 2019

(30) Foreign Application Priority Data
Apr. 16, 2018    (JP) .................. 2018-078710

(51) Int. Cl.
*G06F 3/12*    (2006.01)
*H04N 1/00*    (2006.01)

(52) U.S. Cl.
CPC .......... *G06F 3/1232* (2013.01); *G06F 3/1209* (2013.01); *G06F 3/1292* (2013.01); *H04N 1/00315* (2013.01)

(58) Field of Classification Search
CPC .... G06F 3/1232; G06F 3/1209; G06F 3/1292; H04N 1/00315
See application file for complete search history.

(56) References Cited

U.S. PATENT DOCUMENTS

| 2011/0216361 | A1* | 9/2011 | Nakayama | G06F 3/12 358/1.15 |
| 2014/0078540 | A1* | 3/2014 | Ishida | H04N 1/00233 358/1.13 |
| 2016/0026416 | A1* | 1/2016 | Kikuchi | G06F 3/1292 358/1.15 |
| 2016/0128119 | A1* | 5/2016 | Maheshwari | H04W 4/08 370/329 |
| 2017/0251080 | A1* | 8/2017 | Kato | H04N 1/00307 |
| 2017/0269882 | A1* | 9/2017 | Hasegawa | G06F 3/1226 |

FOREIGN PATENT DOCUMENTS

JP    2014011671 A    1/2014

* cited by examiner

*Primary Examiner* — Juan M Guillermety
(74) *Attorney, Agent, or Firm* — Canon U.S.A., Inc. IP Division

(57) ABSTRACT

According to an exemplary embodiment of the present invention, a combination of specification information of a communication apparatus and predetermined information indicating a search method used for obtainment of the specification information is displayed by a display method in accordance with a selection by a user from among a plurality of display methods.

15 Claims, 15 Drawing Sheets

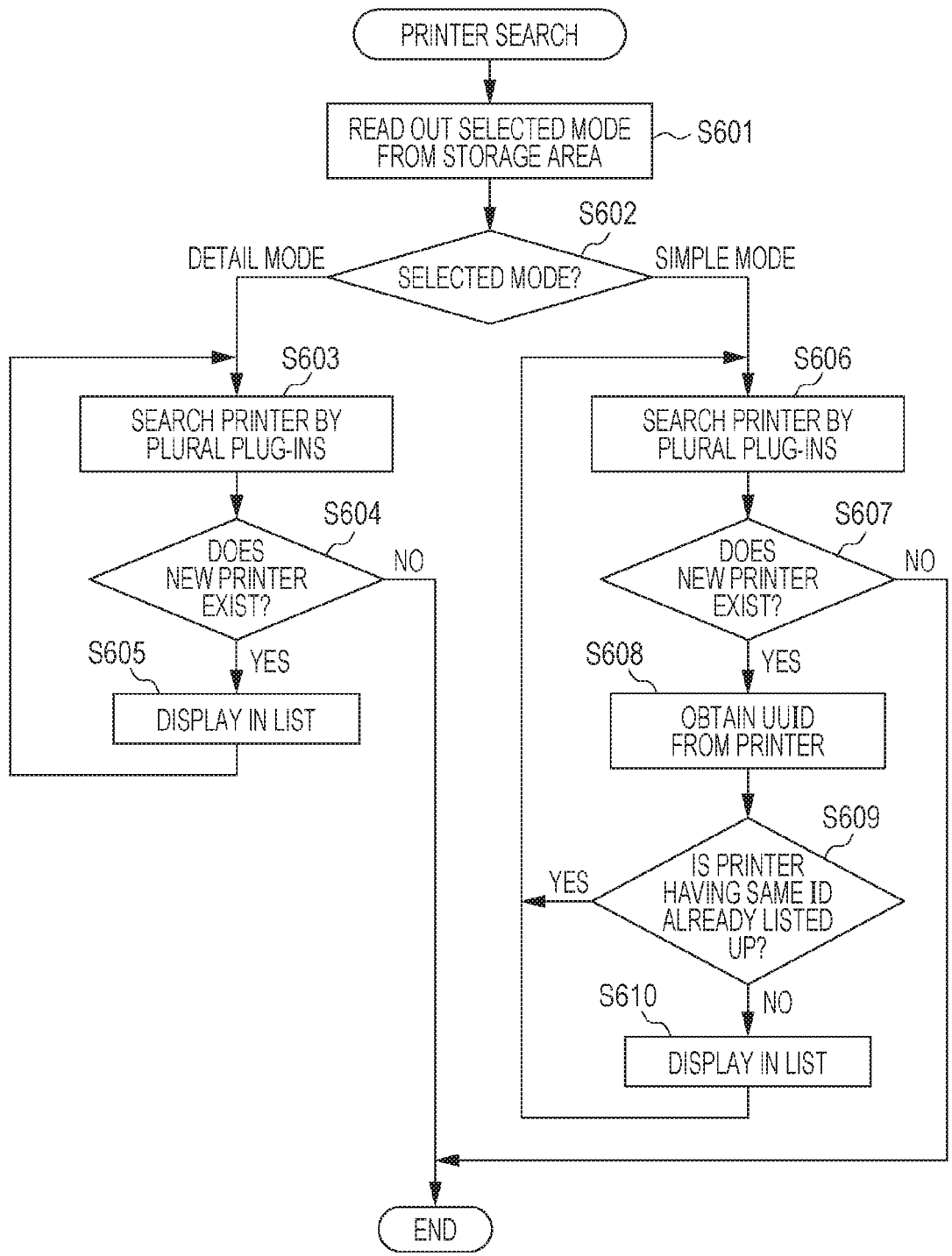

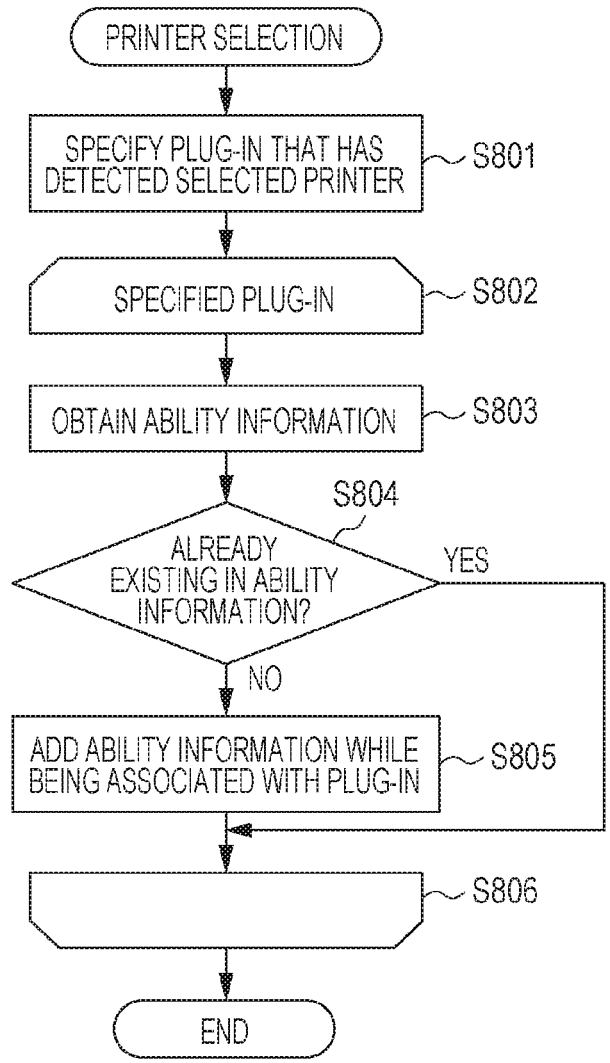

FIG. 11

| PLUG-IN | SHEET SIZE | SHEET TYPE | ...... |
|---|---|---|---|
| PLUG-IN A (GENERAL PURPOSE) | LARGE, POSTCARD, ... | PLAIN PAPER, GLOSSY PAPER, ... | ...... |
| PLUG-IN B (VENDOR SPECIFIC) | LARGE, POSTCARD, ..., SPECIAL SIZE 1 | PLAIN PAPER, GLOSSY PAPER, ..., SPECIAL TYPE 1 | ...... |
| PLUG-IN C (VENDOR SPECIFIC) | LARGE, POSTCARD, ..., SPECIAL SIZE 2 | PLAIN PAPER, GLOSSY PAPER, ..., SPECIAL TYPE 2 | ...... |

INFORMATION PROCESSING APPARATUS THAT SEARCHES FOR COMMUNICATION APPARATUS VIA NETWORK, STORAGE MEDIUM THAT STORES PROGRAM EXECUTED BY THE INFORMATION PROCESSING APPARATUS, AND CONTROL METHOD FOR THE INFORMATION PROCESSING APPARATUS

BACKGROUND

Field

The present disclosure relates to a program for searching for a communication apparatus, an information processing apparatus, and a control method.

Description of the Related Art

In recent years, an information processing apparatus (such as a smart phone) that can communicate with a communication apparatus (such as a printer) by a communication method like a communication via an external access point such as a wireless LAN router or a peer-to-peer communication based on Wi-Fi Direct or the like has been proposed. The above-described information processing apparatus executes processing for searching for a communication apparatus that is located nearby to communicate with. In view of the above, an information processing apparatus has been proposed that presents, to a user, search results of communication apparatuses that can be respectively communicated with by a plurality of communication methods, and that urges the user to select the communication apparatus with which to perform communication from among those discovered communication apparatuses (Japanese Patent Laid-Open No. 2014-11671).

SUMMARY

In a case where the communication apparatuses are searched for by a plurality of search methods such as a plurality of communication methods or the like, the same communication apparatus may be detected by more than one method of the plurality of search methods in some cases. In this case, when information regarding that communication apparatus is to be presented to the user, instead of presenting plural pieces of information regarding the communication apparatuses, each piece of information respectively corresponding to one of the search methods, it is also conceivable to present only one piece of information regarding the communication apparatus, the piece of information corresponding to a single search method.

Various embodiments of the present disclosure are aimed at providing a technology with which, when the same communication apparatus is searched for by a plurality of search methods, it is possible to display information related to the communication apparatus by an appropriate display method in accordance with a user input. According to one embodiment, an information processing apparatus is provided that searches for a communication apparatus via a network, the information processing apparatus including an obtaining unit configured to search for the communication apparatus by using both a first search method and a second search method and to obtain specification information for a user to specify the communication apparatus and identification information for the information processing apparatus to identify the communication apparatus, and a display unit configured to display, in a case where the obtaining unit obtains the specification information and the identification information by the first search method or the second search method, the obtained specification information and predetermined information in association with each other, the predetermined information indicating a search method used for the obtainment from among the first search method and the second search method, in which, in a case where the obtaining unit redundantly obtains the same identification information by the first search method and the second search method, the display unit displays a combination of the specification information corresponding to the same identification information and the predetermined information by a display method in accordance with a selection by the user from among a plurality of display methods.

Further features of the present disclosure will become apparent from the following description of exemplary embodiments with reference to the attached drawings.

BRIEF DESCRIPTION OF THE DRAWINGS

FIG. 6 illustrates an example of printer search processing according to the present exemplary embodiment.

FIGS. 8A and 8B are explanatory diagrams for describing an example of processing after the printer is selected.

FIG. 11 illustrates another example of an ability information management table.

DESCRIPTION OF THE EMBODIMENTS

Hereinafter, exemplary embodiments of the present invention will be described for illustrative purposes with reference to the drawings. It is to be understood that, with regard to the present invention, configurations obtained by applying appropriate alterations and modifications to the exemplary embodiments which will be described below are also within the scope of the present disclosure without departing from the gist of the disclosure on the basis of the knowledge and abilities of a person of ordinary skill in the art.

An information processing apparatus according to the present exemplary embodiment will be described. According to the present exemplary embodiment, a smart phone is described as being the information processing apparatus. It should be noted, however, that not only a smart phone but various devices such as a mobile terminal, a personal computer (hereinafter, which will be referred to as PC), a tablet terminal, a personal digital assistant (PDA), and a digital camera, can be used as the information processing apparatus, without departing from the spirit of the invention. In addition, a printer based on an inkjet method which can communicate with the information processing apparatus is described as being the communication apparatus that is searched for by the information processing apparatus according to the present exemplary embodiment. It should be noted, however, that an image processing apparatus other than the printer based on the inkjet method, the PC, the mobile terminal, the smart phone, the tablet terminal, the PDA, the digital camera, a television set, a scanner, and the like, can be used as the communication apparatus in other embodiments. Moreover, the image processing apparatus other than the printer based on the inkjet method is, for example, an apparatus such as a full-color laser beam printer, a monochrome printer, or an apparatus such as a copier or a facsimile apparatus. Furthermore, those apparatuses may have multiple functions or a single function.

Figure 1:
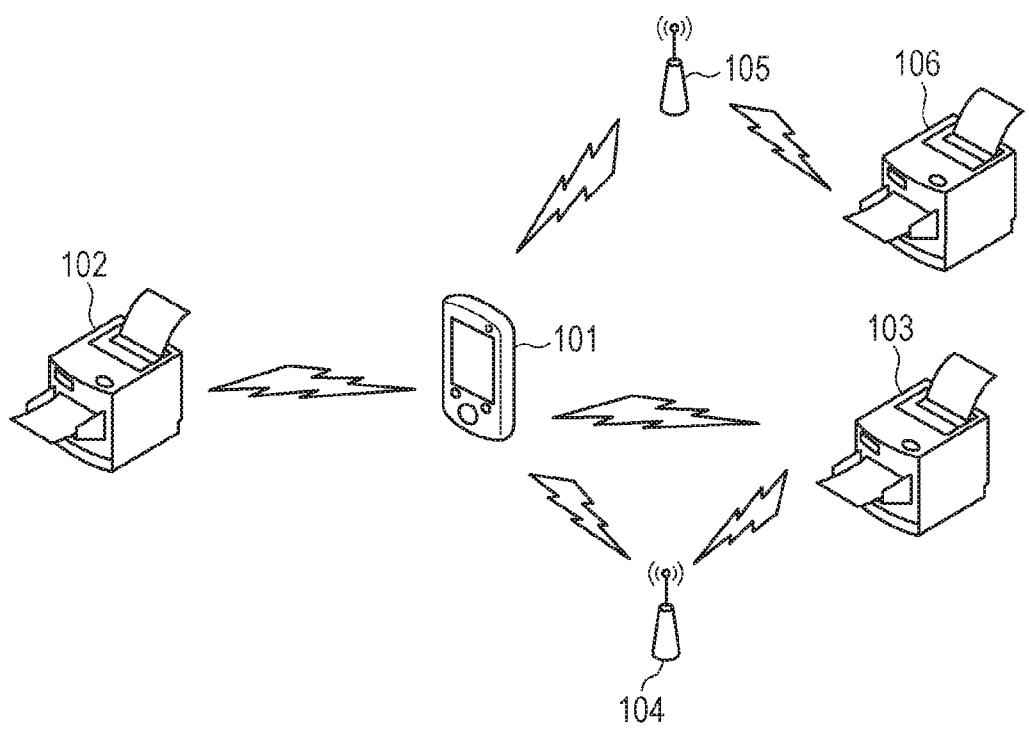
FIG. 1 is a schematic diagram of an information processing system according to the present exemplary embodiment.

FIG. 1 is a schematic diagram of an information processing system according to the present exemplary embodiment. A smart phone 101 is an information processing apparatus according to the present exemplary embodiment. Printers 102, 103, and 106 are communication apparatuses according to the present exemplary embodiment. The smart phone 101 is connected to the printers 102, 103, and 106 via a network such as a wireless LAN. An access point 104 is an external access point that exists in the outside of the information processing apparatus and the communication apparatus. The information processing apparatus can communicate with the communication apparatus connected to the external access point or the internet by communicating via the external access point. According to the present exemplary embodiment, the printer 102 can directly communicate with the smart phone 101 on peer-to-peer and is configured to perform a wireless communication by Wi-Fi (which may also be referred to as Wireless Fidelity) Direct. The printer 103 can also communicate with the smart phone 101 via the access point 104 and is configured to perform a communication by IEEE802.11. The printer 103 can also communicate with the smart phone 101 by Wi-Fi Direct. Furthermore, the printer 106 can communicate with the smart phone 101 via an access point 105 but is not compatible with Wi-Fi Direct.

It should be noted that, according to the present exemplary embodiment, other than the printer 102, a printer which is not illustrated in the drawing but can communicate with the smart phone 101 by Wi-Fi Direct exists. In addition, other than the printer 103, a printer which is not illustrated in the drawing but can communicate with the smart phone 101 by Wi-Fi Direct and the wireless LAN via the access point 104 exists. Furthermore, other than the printer 106, a printer which is not illustrated in the drawing but can communicate with the smart phone 101 via the access point 105 exists.

Figure 2:
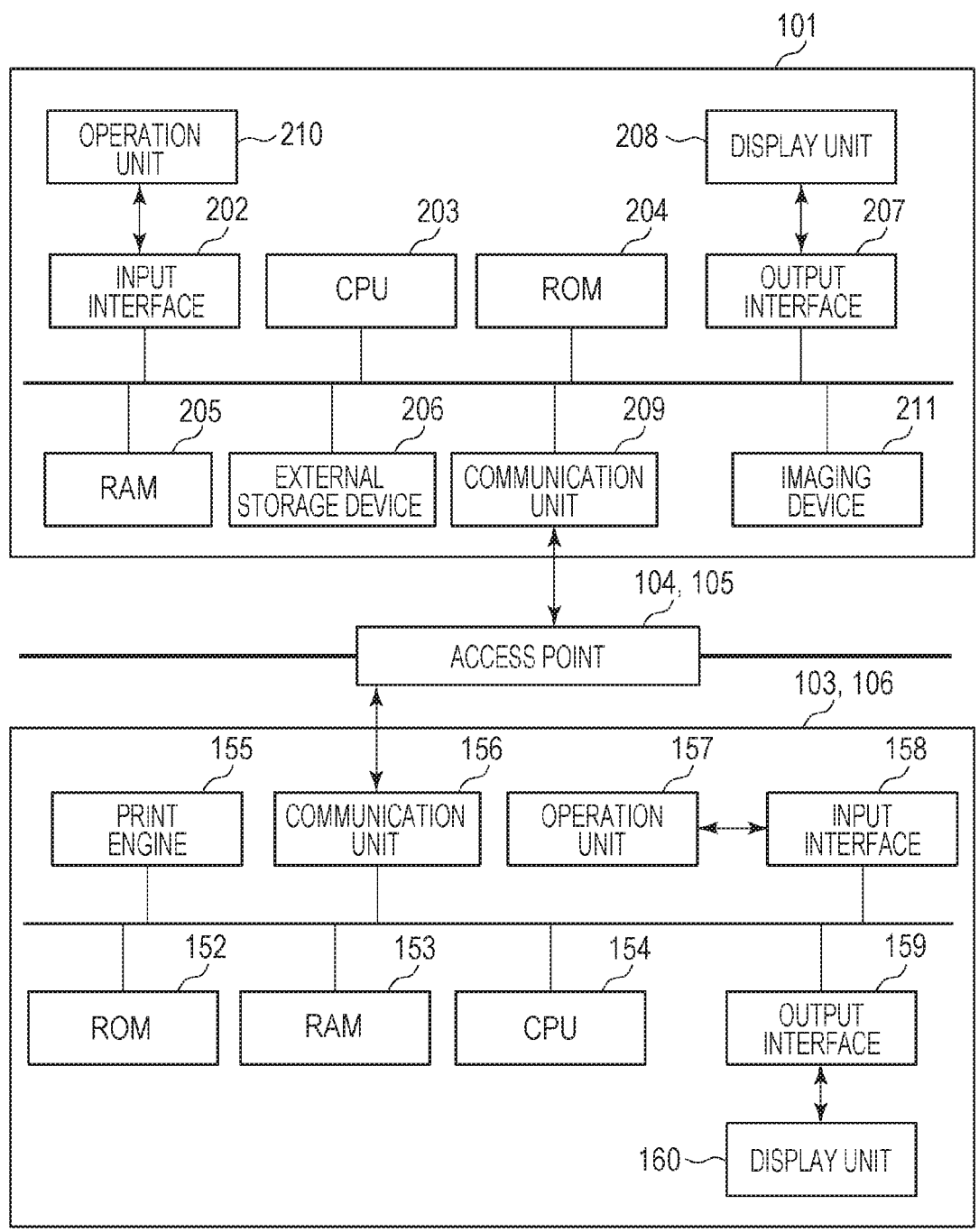
FIG. 2 illustrates configurations of a smart phone and a printer according to the present exemplary embodiment.

FIG. 2 illustrates configurations of the smart phone 101 and the printers 103 and 106 according to the present exemplary embodiment. The smart phone 101 includes an input interface 202, a central processing unit (CPU) 203, a read only memory (ROM) 204, a random access memory (RAM) 205, an external storage device 206, an output interface 207, a display unit 208, a communication unit 209, an operation unit 210, an imaging device 211, and the like.

The operation unit 210 is an operation device configured to accept a data input or an operation instruction from a user and is constituted by a physical keyboard or button, a touch panel, or the like. The input interface 202 transmits a signal corresponding to an operation with respect to the operation unit 210 to the CPU 203. It should be noted that a mode may also be adopted in which the output interface 207 and the input interface 202 which will be described below have the same configuration, and the display on the display unit 208 and the acceptance of the operation from the user with respect to the operation unit 210 are performed by the same configuration.

The CPU 203 is a system control unit and controls the entirety of the smart phone 101. The ROM 204 stores fixed data such as control programs to be executed by the CPU 203, a data table, and an embedded operating system (hereinafter, which will be referred to as OS) program. According to the present exemplary embodiment, the respective control programs stored in the ROM 204 perform software execution control such as scheduling, task switching, and interruption processing under the management of the embedded OS stored in the ROM 204. The random access memory (RAM) 205 is constituted by a static random access memory (SRAM) or the like which uses a backup power source. It should be noted that the RAM 205 can store important data such as program control variables without volatilization since the data is held by a primary battery for backup which is not illustrated in the drawing. In addition, a memory area for storing setting information of the smart phone 101, management data of the smart phone 101, and the like is also included in the RAM 205. The RAM 205 is also used as a main memory and a work memory of the CPU 203.

The external storage device 206 is provided with an application program for handling an image or a document (hereinafter, which will be also referred to as an application) and plug-in software for providing a printing execution function which will be described below (hereinafter, which will be also referred to as a plug-in). The external storage device 206 is also provided with various programs such as a print information generation program for generating print information that can be interpreted by the printers 103 and 106 and an information transmission and reception control program for performing transmission and reception between the printers 103 and 106 connected via the communication unit 209. Various pieces of information to be used by these programs are saved. In addition, image data obtained from the other information processing apparatus or the internet via the communication unit is saved.

The CPU 203 can control the respective components included in the smart phone 101 by executing the various programs stored in the ROM 204 or the external storage device 206 while the RAM 205 is used as a work memory. For example, when the CPU 203 executes the above-described application or plug-in by using the OS, it is possible to realize various processes described in the application or plug-in.

The output interface 207 is an interface for performing control for the display unit 208 to display data or perform a notification of a status of the smart phone 101. The CPU 203 controls the output interface 207 so that it is possible to cause the display unit 208 to perform various display processes. The display unit 208 includes a light emitting diode (LED), a liquid crystal display (LCD), or the like and performs display of data and notification of the status of the smart phone 101. It should be noted that, in a case where the display unit 208 is a touch panel, a soft keyboard provided with keys including a numeric value input key, a mode setting key, an enter key, a cancel key, a power source key, and the like may be displayed on the display unit 208. Then, the input from the user may also be accepted via the display unit 208.

The communication unit 209 is a component for executing the data communication by the control by the CPU 203 while being connected to an apparatus such as a communication apparatus 151. For example, the communication unit 209 can be connected to the access points 104 and 105. In addition, with regard to the printer 103, the communication unit 209 and the communication unit 156 included in the printer 103 are connected to each other by Wi-Fi Direct without the intermediation of the access point. In the case of Wi-Fi Direct, one of the communication unit 209 and the communication unit 156 becomes a group owner, and the connection is established. In the case of the present exemplary embodiment, it is assumed that the communication unit 156 becomes the group owner.

The imaging device 211 is a device configured to convert an image captured by an imaging element into digital data. The digital data is temporarily stored in the RAM 205. Thereafter, when the CPU 203 executes the program, the digital data is converted into a predetermined image format and saved in the external storage device 206 as image data.

Next, configurations of the printers 103 and 106 will be described. It should be noted that the printer 102 is also provided with a configuration similar to the printers 103 and 106. When the communication with the communication unit 209 of the smart phone 101 is performed, it is assumed that the communication unit 156 becomes the group owner, and the communication is performed by Wi-Fi Direct.

The printers 102, 103, and 106 include a ROM 152, a RAM 153, a CPU 154, a printer engine 155, a communication unit 156, an operation unit 157, an input interface 158, an output interface 159, a display unit 160, and the like. In addition, the printers 102, 103, and 106 may be provided with a scanner that reads a document.

The RAM 153 is constituted by a DRAM or the like which uses a backup power source. It should be noted that, since the RAM 153 holds the data while the power source for backup which is not illustrated in the drawing is supplied, it is possible to store important data such as the program control variables without volatilization. The RAM 153 is also used as a main memory and a work memory of the CPU 154 and stores a reception buffer for temporarily saving print information received from the smart phone 101 or the like and various information. The ROM 152 stores fixed data such as the control programs executed by the CPU 154, the data table, and the OS program. According to the present exemplary embodiment, the respective control programs stored in the ROM 152 are stored in the ROM 152 under the management of the embedded OS and include program modules for performing the software execution control such as scheduling, task switching, and interruption processing. In addition, a memory area for storing data to be held even in a case where the power source is not supplied such as setting information of the communication apparatus 151 and management data of the communication apparatus 151 is included in the ROM 152.

The CPU 154 is a system control unit and controls the entirety of the communication apparatus 151 by executing the various programs stored in the ROM 152 while the RAM 153 is used as the work memory.

The printer engine 155 includes a mechanism for conveying a print medium (such as a print sheet) and a mechanism for applying a recording material such as ink or toner to the print medium. In a case where the ink is applied to the print medium, the printer engine 155 includes a carriage to which a recording head for ejecting the ink can be mounted and a mechanism for scanning the carriage with respect to the print medium. The CPU 154 controls the printer engine 155 on the basis of the information saved in the RAM 153 and the print job received from the smart phone 101 or the like and forms an image on the print medium such as paper by using the recording material such as the ink to output a print result. It should be noted that data of the print target and print settings are received from the smart phone 101 through the communication by the communication unit 156.

The operation unit 157 is an operation device configured to accept the data input and the operation instruction from the user and includes a physical keyboard, a button such as a power button, a touch panel, and the like. The input interface 158 transmits a signal corresponding to the operation with respect to the operation unit 157 to the CPU 154. It should be noted that a mode may also be adopted in which the output interface 159 and the input interface 158 which will be described below have the same configuration, and the display on the display unit 160 and the acceptance of the operation from the user to the operation unit 157 are performed by the same configuration. The output interface 159 is an interface for performing control for the display unit 160 to perform display of the data, display related to the status of the printer, and the like.

The display unit 160 includes a light emitting diode (LED), a liquid crystal display (LCD), or the like and performs display of information (such as a personal identification number (PIN) code related to pairing, display of the data, and notification of the status of the communication apparatus 151. It should be noted that, in a case where the display unit 160 is a touch panel, a soft keyboard provided with keys including a numeric value input key, a mode setting key, an enter key, a cancel key, a power source key, and the like may be displayed on the display unit 160, and the input from the user may be accepted via the display unit 160.

Figure 3:
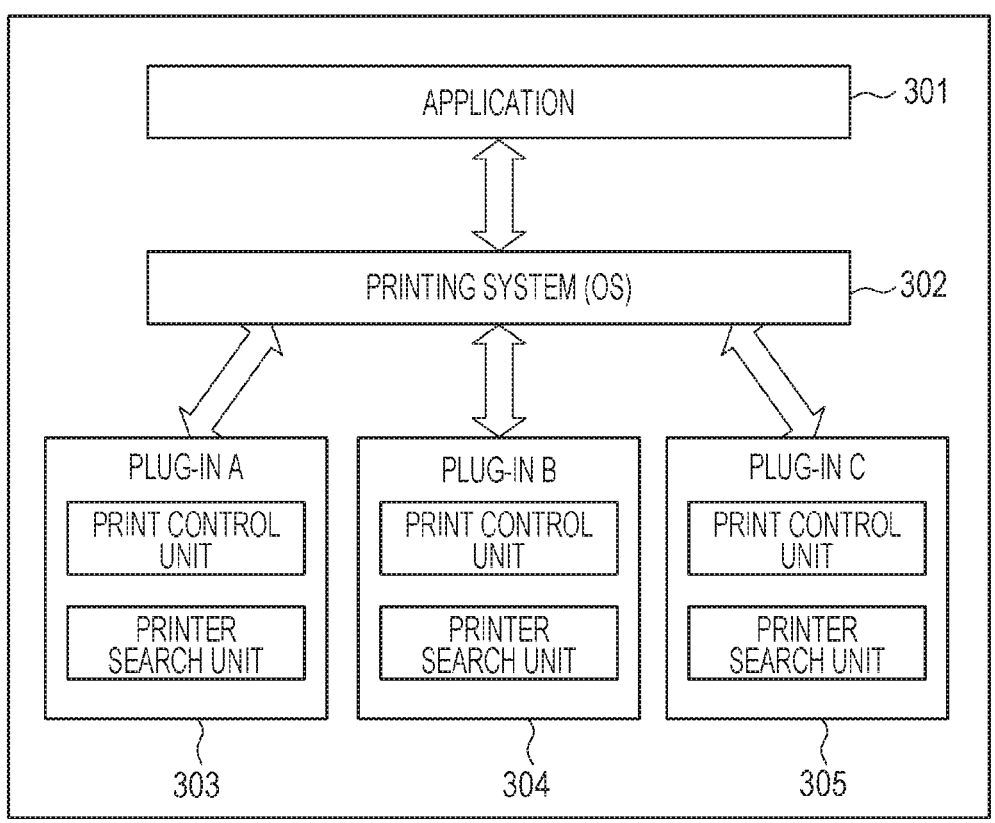
FIG. 3 illustrates a software configuration of the smart phone according to the present exemplary embodiment.

Next, a software configuration of the smart phone 101 will be described. FIG. 3 illustrates the software configuration of the smart phone 101, and the software illustrated in FIG. 3 is stored in the ROM 204.

An application 301 is an application for handling a document, a photograph, or the like. A printing system 302 functions as part of the OS. In a case where the printing is instructed by the user in the application 301, the printing system 302 is called by the application 301. A plug-in A 303 and a plug-in B 304 are both a printing plug-in and installed into the printing system 302 in the form of add-in. Each of the plug-in A 303, the plug in B 304, and a plug-in C 305 is provided with a print control unit corresponding to a program module that performs print setting and generation of a print job and a printer search unit corresponding to a program module that searches for a printer on the network via the OS. The printer search unit searches for a printer by the wireless LAN via the access point and also searches for a printer by Wi-Fi Direct. It should be noted that the search methods are not limited to the above-mentioned two methods, and a search method based on another communication method such as Bluetooth may also be used. In addition, the number of the plug-ins is not limited to three, and still another plug-in may be installed.

Next, an example screen display used in search processing for the printer according to the present exemplary embodiment will be described. FIGS. 4A to 4F illustrate the screen display related to the printing by the smart phone according to the present exemplary embodiment.

Figure 4A:
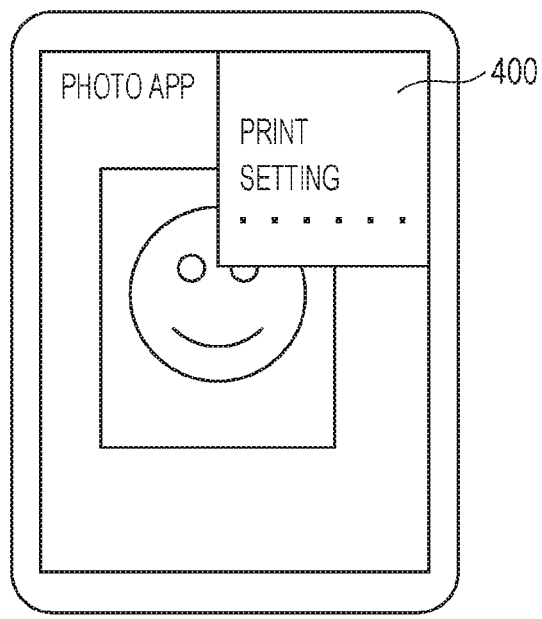
FIGS. 4A to 4F illustrate screen display related to printing by the smart phone according to the present exemplary embodiment.

FIG. 4A illustrates the display screen by the display unit 208 when the user touches a menu button which is not illustrated in the drawing in a case where a candidate photograph of the print target is displayed by the application

301. It should be noted that the display unit 208 is set as a touch panel integrated with the operation unit 210. When the menu button is touched, respective menus are displayed on an upper right of the display unit 208. A print button 400 is included in the above-described menus. When the print button 400 is touched by the user, the screen is switched to the screen illustrated in FIG. 4B. The screen illustrated in FIG. 4B and the screens illustrated in FIGS. 4C to 4F which will be described below are displayed by the printing system 302, for example.

Figure 4B:
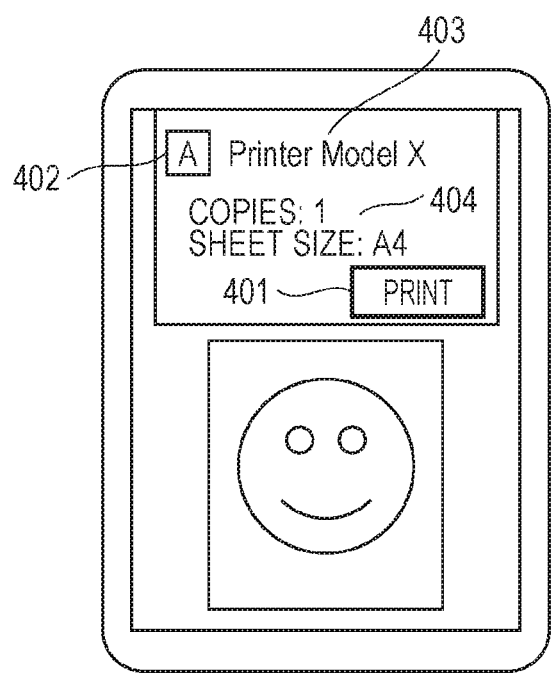

The screen illustrated in FIG. 4B includes a plug-in icon 402 indicating a plug-in to be used for the printing and a printer name 403 as specification information for the user to specify a printer to be used for the printing. It should be noted that the plug-in icon 402 and the printer name 403 displayed in FIG. 4B may correspond to the plug-in and the printer which are used when the latest printing is performed or a plug-in and a printer which are previously set. A print setting 404 indicates the number of copies and a sheet size as the currently set print setting. As will be described below, the setting values indicated in the print setting 404 can also be changed.

Figure 4C:
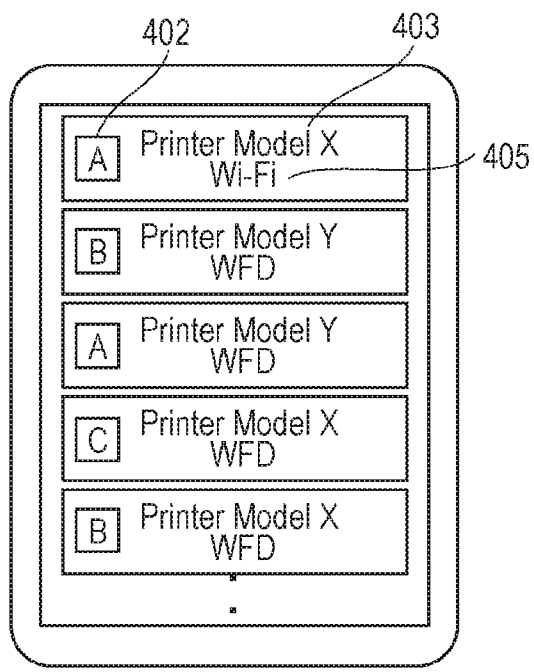
Figure 4D:
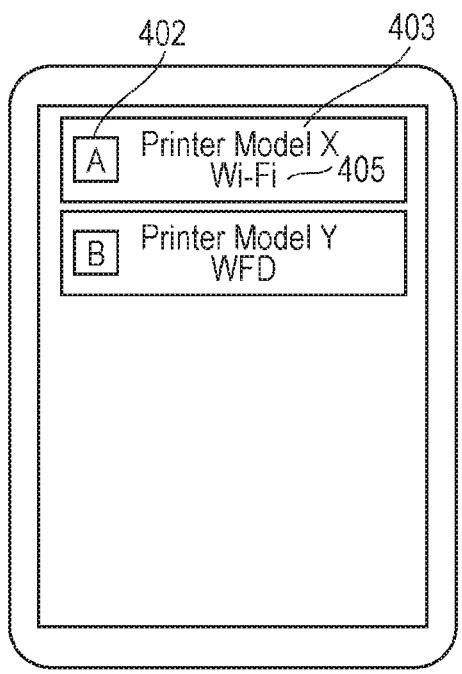

When a print instruction button 401 included on the screen illustrated in FIG. 4B is touched by the user, the CPU 203 transmits the print job to the printer having the printer name 403 which has been designated by the printing system 302 on the screen illustrated in FIG. 4B via the communication unit 209. The print job includes the currently set print setting and the data such as the photograph or the document of the print target illustrated in FIG. 4B. The printer that has received the print job prints the data of the print target included in the print job in accordance with the print setting included in the print job. It should be noted that the communication method for transmitting the print job to the printer is a communication method used in the previous printing for the printer. In a case where a selection by the user is performed in FIG. 4C or FIG. 4D which will be described below, a communication method in accordance with the selection is used. Communication information such as an IP address for establishing a communication with the printer or identification information such as a MAC address for searching for the printer is previously registered in the printing system 302. Alternatively, in a case where the selection by the user is performed in FIG. 4C or FIG. 4D which will be described below, the communication information or the identification information obtained in the printer search for the display of FIG. 4C or FIG. 4D is used. At the time of the transmission of the print job, the print job is transmitted to the printer in accordance with the communication information, or the communication unit 209 searches for the printer by using the identification information, and the print job is transmitted to the searched printer.

When the user touches the plug-in icon 402 or the printer name 403 on the screen illustrated in FIG. 4B, the printer is searched for by each of the plug-in A 303, the plug-in B 304, and the plug-in C 305 via the network. Specifically, the printer is searched for by Wi-Fi via the access point, and the printer is searched for by Wi-Fi Direct by the respective plug-ins. It should be noted that various protocols such as Bonjour, Web Services on Devices (WSD), and Internet Printing Protocol (IPP) may be used as a protocol used in the search for the printer. The information related to the printers is obtained from the printers detected by the searches by the respective plug-ins. The obtained information includes a universally unique identifier (UUID) corresponding to the identification information of each printer and the printer name of each printer.

FIG. 4C illustrates a list screen of the printers detected by the searches by the respective plug-ins. The printing system 302 queries the respective plug-ins for search results and displays the list screen illustrated in FIG. 4C on the basis of responses (such as the printer name, the communication method, and the UUID) from the respective plug-ins. The printer name 403 as the specification information obtained from the printer, a communication method 405 used for the detection, and the plug-in icon 402 indicating the plug-in that has performed the detection are displayed together as one option on the list screen of the printers. It should be noted that the communication method 405 mentioned herein is Wi-Fi or WFD (Wi-Fi Direct). A plurality of options corresponding to combinations of the printer names of the printers, the plug-ins, and the communication methods are displayed on the list screen of the printers illustrated in FIG. 4C. Then, the user can designate the printer, the plug-in, and the communication method to be used for the printing by selecting a desired option. It should be noted that a display order in the list illustrated in FIG. 4C is not particularly limited. According to the present exemplary embodiment, a result that has been detected earlier than others is displayed on a higher rank in the list. However, the configuration is not limited to this. Priority levels may be previously set in the plug-ins and the communication methods, and the plug-in and the communication method having the higher priority level may be displayed in the higher rank in the list.

FIG. 4D illustrates the list screen of the printers detected by the searches by the respective plug-ins in accordance with a display method different from FIG. 4C. It should be noted that the detection results by the respective plug-ins are the same as the case of FIG. 4C, and the detected printers are only the printer having a printer name "Printer Model X" and the printer having a printer name "Printer Model Y". In a case where the display illustrated in FIG. 4D is performed, the printing system 302 omits the display of the redundantly detected printer on the basis of the UUIDs obtained from the printers detected by the searches by the respective plug-ins. That is, information indicating only one search method among the plurality of search methods (plug-ins or communication methods) in which the printer is detected is displayed together with the specification information (printer name) of the printer. Specifically, first, it is assumed that the printer of "Printer Model X" is detected by the plug-in A 303 via Wi-Fi, and thereafter, the printer of "Printer Model Y" is detected by the plug-in B 304 via WFD. As illustrated in FIG. 4C, thereafter, "Printer Model Y" is detected by the plug-in A 303 via WFD, and "Printer Model X" is detected by the plug-in C 305 via WFD. It should be noted however that the printing system 302 determines that the UUIDs obtained from these printers are the same UUIDs of the already displayed printers and omits the display with regard to these printers. Herein, since only the two printers are detected in actuality, only two options corresponding to the two printers are displayed as illustrated in FIG. 4D.

As illustrated in FIG. 4D, in the list display of the printers, a situation is avoided where redundant display of the same printer is performed, and options corresponding to the actual number of printers are displayed. With this configuration, the user can easily perform the printer selection operation. On the other hand, the display method illustrated in FIG. 4C may be preferably adopted by the user in some cases. For example, this is a case where the plug-in desired by the user exists among the plurality of plug-ins. Herein, it is assumed that the plug-in A 303 is a common plug-in commonly used by a plurality of manufacturers (vendors), and each of the plug-in B 304 and the plug-in C 305 is a specific plug-in specific to the printer manufacturer vendor).

It should be noted that the printer manufacturers that provide the plug-in B 304 and the plug-in C 305 may be the same printer manufacturer or may also be different printer manufacturers. Even when the printer manufacturers are the same, for example, a plurality of plug-ins for different printing main purposes may also be provided. In this case, the plug-in B 304 and the plug-in C 305 are provided from the same vendor as the plug-ins in which different print settings can be performed. Then, "Printer Model X" and "Printer Model Y" may be detected by both the plug-in B 304 and the plug-in C 305 as the printers of the vendor that provides the plug-in B 304 and the plug-in C 305.

Even in a case where the plug-in B 304 and the plug-in C 305 are provided by the different vendors, for example, when filtering for detecting only its own brand printer is not performed, the printer of another vendor may also be detected. It is also assumed that the above-described filtering is performed to detect the printer under a condition that the printer name includes its own company name, for example. In this case too, when the user can arbitrarily change the printer name in the printer, the printer of the other vendor may also be detected. For this reason, as illustrated in FIG. 4C, the printer of "Printer Model X" may be detected by both the plug-in B 304 and the plug-in C 305 provided by the different vendors.

In the specific plug-in, a print setting specific to the manufacturer can be performed in some cases. In particular, for a power user (experienced user) who performs a detail setting as the print setting, the specific plug-in may be more preferably used than the common plug-in in some cases. In the above-described case, when only one option with regard to the single printer name is displayed as illustrated in FIG. 4D, a situation may occur where the specific plug-in desired by the user is not selected. In addition, in the case of the power user who performs the detail setting as the print setting, when the plug-in icon 402 is confirmed in FIG. 4C, the desired plug-in can be selected in many cases by distinguishing the common plug-in and the specific plug-in from each other. Similarly, when the communication method 405 of FIG. 4C is confirmed, the communication method can be selected in many cases.

That is, among the display method for the printer list display illustrated in FIG. 4C and the display method for the printer list display illustrated in FIG. 4D, an appropriate display method varies depending on the user. For this reason, according to the present exemplary embodiment, the display method when the same printer is detected by the plurality of plug-ins and the plurality of communication methods in the printer search is switched depending on information previously input by the user. Specifically, the list of the printers is displayed by the display method corresponding to the information previously input by the user among the display method illustrated in FIG. 4C and the display method illustrated in FIG. 4D. The information previously input by the user includes, for example, a type of a sheet to be used for the printing, a result of a selection on whether the user is a general user or a power user, and the like. The detail will be described below with reference to FIGS. 5A and 5B.

It should be noted that sorting processing may be automatically performed in accordance with priority levels previously decided with respect to the plug-in and the communication method in the list illustrated in FIG. 4C. When the user performs the selection in either the case of FIG. 4C or FIG. 4D, the display returns to the screen illustrated in FIG. 4B which includes the selected plug-in icon 402 and the selected printer name 403.

Figure 4E:
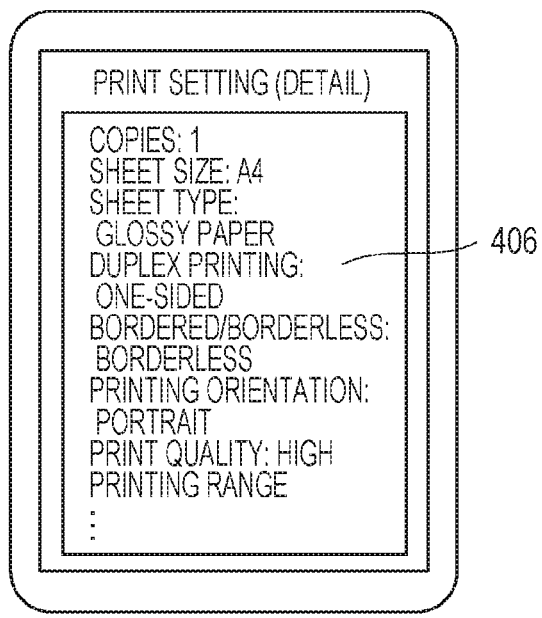

When the print setting 404 illustrated in FIG. 4B is touched, a print setting (detail) 406 is displayed on the screen illustrated in FIG. 4E. When one of the setting items such as "copies" and "sheet size" in the print setting (detail) 406 is touched, the screen illustrated in FIG. 4F for changing the setting value of the setting item to another value is displayed. When one of the setting values 407 is selected, the selected setting value is set as the setting value of the setting item.

When the selection of the plug-in and the printer name is performed on the screen illustrated in FIG. 4C or FIG. 4D described above, the selected plug-in and the printer name are decided as the plug-in and the printer used for the printing. Then, the display is returned to the screen illustrated in FIG. 4B indicating the plug-in and the printer. In addition, types and the number of print setting items in the print setting (detail) 406 illustrated in FIG. 4E and types and the number of the setting values 407 illustrated in FIG. 4F depend on the plug-in decided to be used for the printing in FIG. 4B. For example, it is assumed that the plug-in specific to the printer vendor has more items and setting values that can be set than those of the general-use plug-in for the plurality of printer vendors. That is, when the user selects a general-use plug-in on the screen illustrated in FIG. 4C or FIG. 4D, it is possible to more easily perform the print setting, and when the specific plug-in is selected, it is possible to perform the print setting in more detail.

Figure 4F:
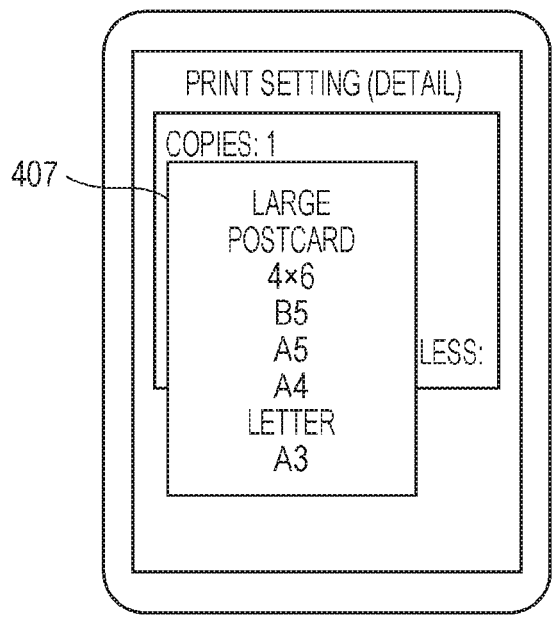

It should be noted that in each of FIG. 4E and FIG. 4F includes a return button which is not illustrated in the drawing. When the return button on the screen of FIG. 4F is touched, the display returns to the screen of FIG. 4E, and when the return button on the screen of FIG. 4E is touched, the display returns to the screen of FIG. 49. It should be noted that, in a case where the setting value of the print setting is changed on the screen illustrated in FIG. 4F, when the display returns to the screen illustrated in FIG. 4B, the set value after the change is displayed as the print setting 404.

Figure 5A:
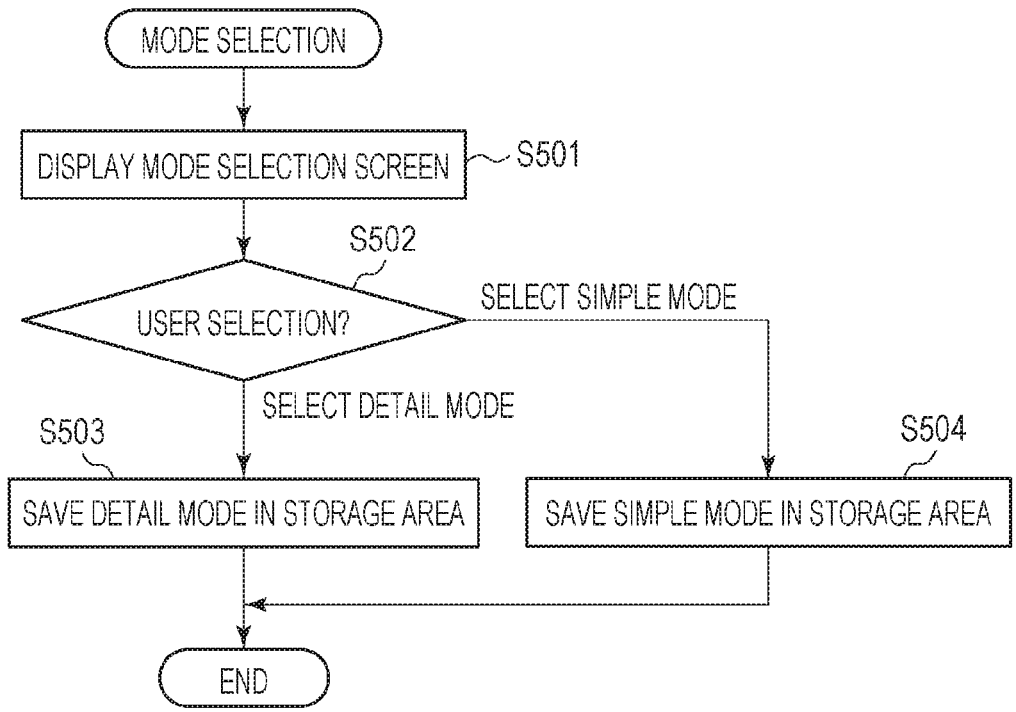
FIGS. 5A and 5B illustrate selection processing for a print mode according to the present exemplary embodiment.
Figure 5B:
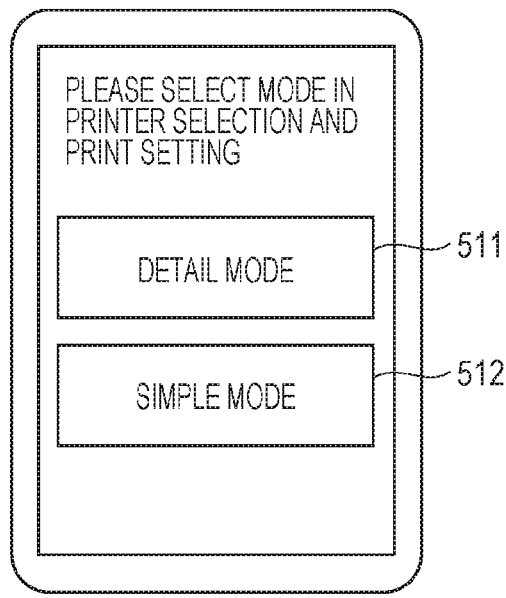

FIGS. 5A and 5B illustrate selection processing for a print mode according to the present exemplary embodiment. The processes in the respective steps illustrated in FIG. 5A are realized when the CPU 203 executes the printing system 302 corresponding to part of the OS stored in the ROM 201 while the RAM 205 is used as the work memory. In addition, the processing illustrated in FIG. 5A is started when the print button 400 on the screen illustrated in FIG. 4A or a print mode setting button included on the print setting screen of the OS which is not illustrated in the drawing is pressed (touched).

In S501, the CPU 203 displays a mode selection screen illustrated in FIG. 5B on the display unit 208. In S502, the CPU 203 determines whether a detail mode button 511 or a simple mode button 512 is touched on the screen illustrated in FIG. 5B. It should be noted that, in a case where a cancel button which is not illustrated in the drawing is touched, the display may return to the screen illustrated in FIG. 4A.

In S502, in a case where it is determined that the detail mode button 511 is touched, the CPU 203 saves a state in which the detail mode is selected in a predetermined storage area of the RAM 205 in S503. On the other hand, in S502, in a case where it is determined that the simple mode button 512 is touched, the CPU 203 saves a state in which the simple mode is selected in the predetermined storage area of the RAM 205 in S504.

When the selected mode is saved in S503 or S504, the processing of FIGS. 5A and 5B is ended. Then, the screen illustrated in FIG. 4B is displayed on the display unit 208.

It should be noted that, even in a case where the processing in FIG. 5A is started by the press of the print button 400, it is also conceivable that some users do not desire that the screen illustrated in FIG. 5B is displayed each time the print button 400 is pressed. For this reason, a check box together with a message such as "would you like to select mode in subsequent occasions too?" may be displayed on the screen illustrated in FIG. 5B. When the print button 400 is pressed for the first time in the smart phone 101, the processing illustrated in FIG. 5A is executed, and the screen illustrated in FIG. 5B is displayed. Then, in a case where the check box is not ticked when the user selects the mode, the screen illustrated in FIG. 5B may not be displayed when the print button 400 is pressed for the next time. In this case, the subsequent processing may be processed while the latest mode stored in S503 or S504 is set as the mode selected by the user. On the other hand, in a case where the above-described check box is ticked when the user selects the mode, the processing illustrated in FIG. 5A is also executed when the print button 400 is pressed for the next time, and the screen illustrated in FIG. 5B is displayed. It should be noted that, even in a case where the display of the screen illustrated in FIG. 5B is skipped at the time of the press of the print button 400, the mode selection can be performed by the press of the print mode setting button included on the print setting screen of the OS which is not illustrated in the drawing.

FIG. 6 illustrates an example of the printer search processing according to the present exemplary embodiment. It should be noted that the processing illustrated in FIG. 6 is realized when the CPU 203 executes the printing system 302 corresponding to part of the OS stored in the ROM 204 and the plug-ins A to C while the RAM 205 is used as the work memory. The processing illustrated in FIG. 6 is started when the plug-in icon 402 or the printer name 403 on the screen illustrated in FIG. 4B is touched.

In S601, the CPU 203 reads out the selected mode previously saved in the predetermined storage area of the RAM 205 in S503 or S504 in FIGS. 5A and 5B on the basis of the printing system 302. In S602, the CPU 203 determines whether or not the selected mode read out in S601 is the detail mode or the simple mode on the basis of the printing system 302. In S602, in a case where it is determined that the selected mode is the detail mode, in S603, the CPU 203 activates the plug-ins A to C on the basis of the printing system 302. Then, the CPU 203 searches for the printer in accordance with the communication methods (Wi-Fi and/or Wi-Fi Direct) supported by the respective plug-ins by the plug-ins A to C.

In S604, the CPU 203 determines whether or not a printer newly detected by the printer search from the plug-ins A to C exists on the basis of the printing system 302. It should be noted that a determined period of time is set in the determination in S604, and in a case where it is determined that the printer is not newly detected for the determined period of time, the processing illustrated in FIG. 6 is ended. On the other hand, in S604, in a case where it is determined that the printer is newly detected, the processing proceeds to S605. In S605, the CPU 203 displays the printer name 403 of the printer detected by the printer search in S603, the plug-in icon 402 of the plug-in used for the detection, and the communication method 405 used for the detection in a list on the basis of the printing system 302. When the processing in S603 to S605 is repeatedly performed, the list illustrated in FIG. 4C is displayed.

On the other hand, in S602, in a case where it is determined that the selected mode is the simple mode, the processing proceeds to S606. Since the processing in S606 and S607 is similar to the processing in S603 and S604, the descriptions thereof will be omitted. In S607, when it is determined that the printer is newly detected, in S608, the CPU 203 obtains a UUID from the detected printer on the basis of the printing system 302. As will be described below, the processing in S608 may be repeatedly performed plural times in some cases. In view of the above, in S609, the CPU 203 determines whether or not the UUID newly obtained in S608 is the same as the UUID already obtained in the previous processing in S608 on the basis of the printing system 302. In a case where it is determined that the same UUID is not already obtained, the processing proceeds to S610. In S610, the CPU 203 displays the printer name 403 of the printer detected by the printer search in S606, the plug-in icon 402 of the plug-in used for the detection, and the communication method 405 used for the detection in a list on the basis of the printing system 302. On the other hand, in S609, in a case where it is determined that the same UUID is already obtained, the processing in S610 is skipped, and the processing returns to S606. The list illustrated in FIG. 4D is displayed by the processing in S606 to S610. That is, even when the same printer is detected by the different plug-ins or the different communication methods, the single printer name 403, the single plug-in icon 402, and the single communication method 405 are displayed with respect to the single printer.

In a case where the user selects the detail mode by the processing illustrated FIG. 6, since the list illustrated in FIG. 4C is displayed, the user can cause the desired printer to execute the printing by using the desired plug-in and the communication method. For example, according to the present exemplary embodiment, since the print setting that can be set by the plug-in varies, for example, in a case where the printer vendor-specific print setting is desired to be performed, the print setting can be performed by selecting the vendor-specific plug-in. On the other hand, in a case where the user selects the simple mode, the list illustrated in FIG. 4D is displayed. For this reason, the user can easily select the desired printer.

Next, another example of the printer search in accordance with the mode selected by the user will be described. Specifically, the plug-in used in the printer search and the printing is selected in accordance with the mode selected by the user. In the display of the printer list, for example, as illustrated in FIG. 4D, the display is performed such that the redundant display is not performed with regard to the same printer.

Figure 7A:
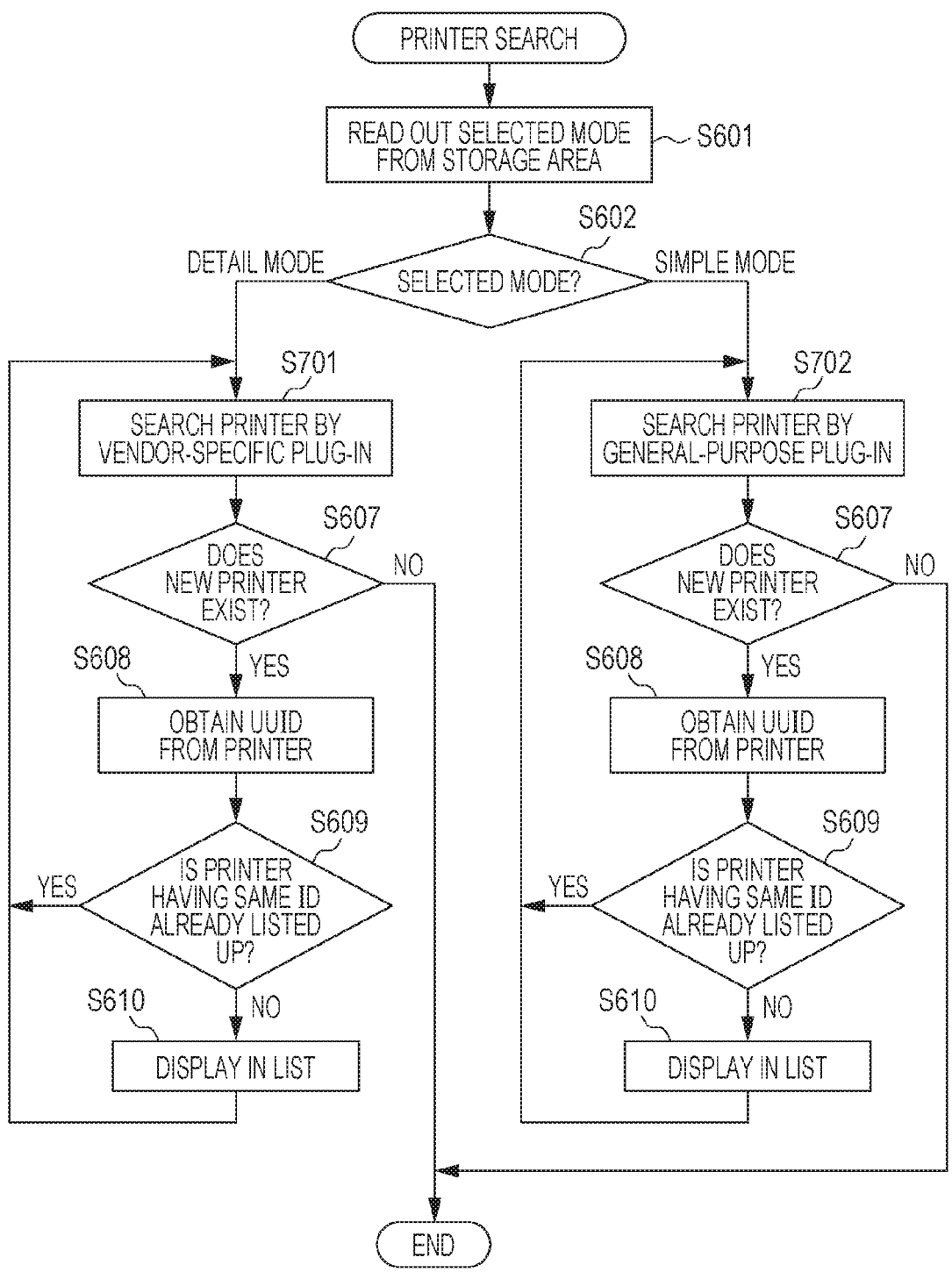
FIGS. 7A to 7C illustrate another example of printer search processing according to the present exemplary embodiment.
Figure 7B:
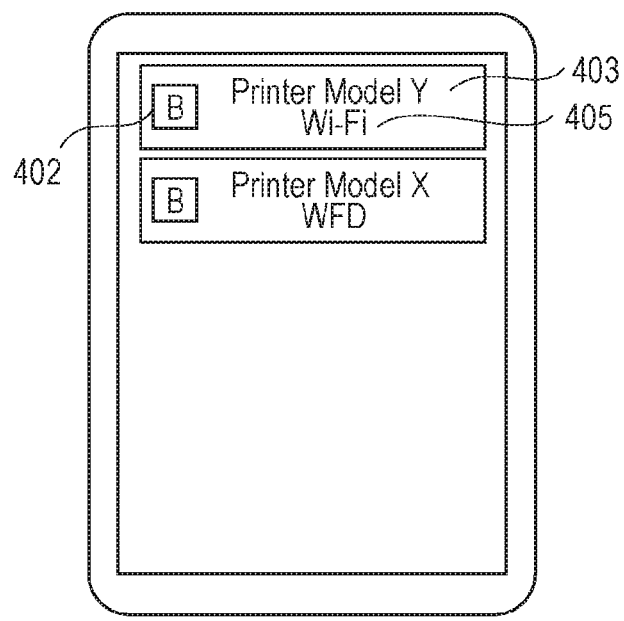
Figure 7C:
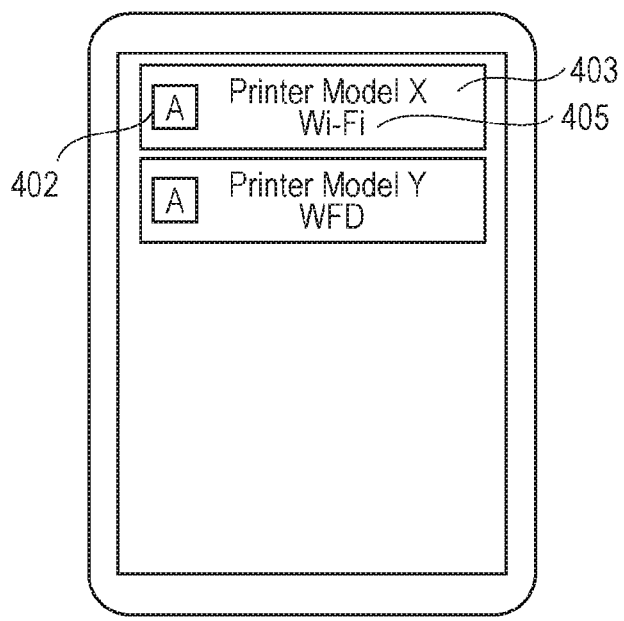

FIGS. 7A to 7C illustrate another example of the printer search processing according to the present exemplary embodiment. It should be noted that the processing illustrated in FIG. 6 is realized when the printing system 302 corresponding to part of the OS stored in the ROM 204 and the plug-ins A to C is executed by the CPU 203 while the RAM 205 is used as the work memory. The processing illustrated in FIG. 6 is started when the plug-in icon 402 or the printer name 403 on the screen illustrated in FIG. 4B is touched.

Since the processing illustrated in S601 and S602 in FIGS. 7A to 7C is similar to the processing illustrated FIG. 6, the descriptions thereof will be omitted. In S602, when it is determined that the detail mode is selected, in S701, the CPU 203 selects the plug-in specific to the printer vendor (for example, the plug-in B 304) as the plug-in used in the printer search on the basis of the printing system 302. Then, the CPU 203 performs the printer search by the vendor-specific plug-in. It should be noted that, in a case where a plurality of plug-ins specific to the printer vendor exist (for example, the plug-in B 304 and the plug-in C 305), in S701, a screen for selecting the plug-in used in the printer search from the plurality of plug-ins may be displayed. Since the processing in S701 and subsequent steps is similar to the processing in S607 to S610 in FIG. 6, the descriptions thereof will be omitted. By these processes, as illustrated in FIG. 7B, the result of the search for the printer by the plug-in specific to the printer vendor (for example, the plug-in B 304) is displayed.

On the other hand, in S602, when it is determined that the simple mode is selected, the processing proceeds to S702. In S702, the CPU 203 selects a general-use plug-in for a plurality of printer vendors (for example, the plug-in A 303) as the plug-in used in the printer search on the basis of the printing system 302. Then, the CPU 203 performs the printer search by the general-use plug-in. Since the processing in S702 and subsequent steps is similar to the processing in S607 to S610 in FIG. 6, the descriptions thereof will be omitted. By these processes, as illustrated in FIG. 7C, the result of the search for the printer by the general-use plug-in (for example, the plug-in A 303) is displayed.

By the processing illustrated in FIGS. 7A to 7C, for example, when the user who desires to perform the detail print setting selects the detail mode on the screen illustrated in FIG. 5B, the printer search is performed by the specific plug-in. When the printer is selected in FIG. 7B, the specific plug-in is displayed on the screen illustrated in FIG. 4B as the plug-in used for the printing. When the print setting 404 is touched by the user and the screens illustrated in FIG. 4E and FIG. 4F are displayed, it is possible to perform the setting from more setting values with regard to more setting items than the general-use plug-in.

On the other hand, when the user who desires to simply perform the printing selects the simple mode on the screen illustrated in FIG. 5B, the printer search is performed by the general-use plug-in. When the printer is selected in FIG. 7C, the general-use plug-in is displayed on the screen illustrated in FIG. 4B as the plug-in used for the printing. When the print setting 404 is touched by the user, the screens illustrated in FIG. 4E and FIG. 4F are displayed, it is possible to more easily perform the print setting than the general-use plug-in.

It should be noted that the processing equivalent to S607 to S610 in FIG. 6 is executed as the processing in S701 and S702 and subsequent steps in FIGS. 7A to 7C, but the processing equivalent to S603 to S605 in FIG. 6 may be executed as the processing in S701 and S702 and subsequent steps. In this case, the options corresponding to the plurality of respective communication methods (Wi-Fi, Wi-Fi Direct) are displayed as the list of the printers with respect to the same printer.

In addition, the processing equivalent to S607 to S610 in FIG. 6 may be executed as the processing in S702 and subsequent steps in FIGS. 7A to 7C, and the processing equivalent to S603 to S605 in FIG. 6 may be executed as the processing in S701 and subsequent steps. That is, while the plurality of options with respect to the same printer are not displayed by the processing in S702 and subsequent steps, as illustrated in FIG. 7C, the options in accordance with the plurality of respective communication methods with respect to the same printer are displayed by the processing in S701 and subsequent steps. Therefore, while the user who has selected the simple mode performs the selection without taking the communication method into account, the user who has selected the detail mode can perform the selection including the communication method.

Furthermore, in the above descriptions, it is supposed that both the vendor-specific plug-in and the general-use plug-in are installed in the smart phone 101 when the flow chart illustrated in FIGS. 7A to 7C is started. However, only one of the vendor-specific plug-in and the general-use plug-in may be installed. For this reason, after the flow chart illustrated in FIGS. 7A to 7C is started, before the processing in S601 is performed, the determination processing for determining the type of the plug-in that has been installed in the smart phone 101 may be performed as the processing in which is not illustrated in the drawing. It should be noted that the determination processing in S600 is also realized when the printing system 302 is executed by the CPU 203 while the RAM 205 is used as the work memory.

Then, in S600, in a case where it is determined that the vendor-specific plug-in is installed and the general-use plug-in is not installed, the processing in S601 and S602 is not performed, and the processing proceeds to S701. On the other hand, in S600, in a case where it is determined that the vendor-specific plug-in is not installed and the general-use plug-in is installed, the processing in S601 and S602 is not performed, and the processing proceeds to S702. It should be noted that, in S600, in a case where it is determined that none of the printing plug-ins are installed, display processing for advising installment of a printing plug-in which is not illustrated in the drawing may be performed by the CPU 203. This display processing is, for example, processing for displaying a Web page for downloading the general-use plug-in by a Web browser.

The example in which the print setting items and the setting values that can be selected on the screens illustrated in FIG. 4E and FIG. 4F are decided by the plug-in selected on the screen illustrated in FIG. 4B has been described above.

However, the configuration is not limited to this, the screens illustrated in FIG. 4E and FIG. 4F may be displayed such that it is possible to select all of the print setting items and the setting values that can be set by one of the plurality of plug-ins (the plug-ins A to C). Alternatively, the screens illustrated in FIG. 4E and FIG. 4F may be displayed such that it is possible to select the print setting items and the setting values that can be selected by one of the plurality of plug-ins (the plug-ins A to C) and also can be executed by the printer selected in FIG. 4B. When the user sets the print setting, the plug-in used for the printing is automatically decided on the basis of the print setting.

FIGS. 8A and 8B are explanatory diagrams for describing an example of processing after the printer is selected. It should be noted that the processing illustrated in FIG. 8A is realized when the printing system 302 corresponding to part of the OS stored in the ROM 204 and the plug-ins A to C is executed by the CPU 203 while the RAM 205 is used as the work memory. The processing illustrated in FIG. 8A is started when one of a plurality of options including the plug-ins, the printer names, and the communication methods is touched to select the printer on the screen illustrated in FIG. 4C or FIG. 4D. Herein, a case where the printer is selected on the screen illustrated in FIG. 4C will be described. In addition, it is assumed that the plug-in A 303 is a general-use plug-in that supports printers of a plurality of vendors, and the plug-in B 304 and the plug-in C 305 are plug-ins that respectively support printers of different vendors.

An ability information management table illustrated in FIG. 8B is created in the RAM 205 by the processing illustrated in FIG. 8A which will be described below, for example. The ability information management table indicates setting values supported by the respective plug-ins which can be set as the print settings with respect to the predetermined print setting item among the setting values supported by the printer selected by the user on the screen illustrated in FIG. 4C. For example, it is assumed that the user selects the printer of the printer vendor that provides the plug-in B, and the printer and the plug-in B support a printer vendor-specific "special size" as the setting value of the sheet size in the print setting. In this case, since the "special size" is supported by only the plug-in B 304 among the plug-ins A to C, as illustrated in FIG. 8B, the setting value "special size" is saved while being associated with only the plug-in B 304 in the ability information management table.

In S801, the CPU 203 specifies the plug-in that has detected the printer selected by the user on the screen illustrated in FIG. 4C on the basis of the printing system 302. Herein, in addition to the plug-in of the plug-in icon 402 included in an option selected by the user, another plug-in that has detected a printer having the same printer name as the printer name 403 included in the option is also specified. Specifically, for example, in a case where the user selects a highest rank option in FIG. 4C, the plug-in A 303 corresponding to the option is specified. Furthermore, a printer name "Printer Model X" included in the highest rank option is also detected by the plug-in B 304 and the plug-in C 305 as illustrated in the fourth and fifth options in a list of FIG. 4C. For this reason, in S801, the plug-in B 304 and the plug-in C 305 are also specified in addition to the plug-in A 303.

Next, the CPU 203 repeatedly performs the processing in S802 to S806 with regard to each of one or a plurality of plug-ins specified in S801. In the above-described example, since the plug-ins A to C are specified in S801, the processing in S802 to 806 is executed three times, but here, the processing with regard to the plug-in A will be described.

In S803, the CPU 203 obtains ability information related to the print setting from the selected printer (in the above-described example, the printer having the printer name "Printer Model X") on the basis of the printing system 302 and the plug-in A 303. Specifically, the print setting items that can be designated with respect to the printer such as "sheet size", "sheet type", and "printing orientation" and the setting values that can be designated with respect to the printer as the print setting items are obtained.

It should be noted that, in a case where the used plug-in (herein, the plug-in A 303) detects the printer selected by the plurality of communication methods, the obtainment of the ability information in S803 is performed by the plurality of communication methods. For example, in the display illustrated in FIG. 4C, it is assumed that the printer name for the printer of "Printer Model X" is detected by the plug-in A 303 by Wi-Fi Direct in addition to Wi-Fi. In this case, in S803, the ability information is obtained by both Wi-Fi and Wi-Fi Direct. With this configuration, for example, even in a case where the ability information is not appropriately obtained by one of the communication methods, the ability information can be obtained by the other communication method.

It should be noted however that, in this case, the same ability information may be redundantly obtained in some cases. For this reason, in S804, the CPU 203 determines whether or not the ability information obtained in S803 already exists in the ability information management table on the basis of the printing system 302. In a case where it is determined that the ability information obtained in S803 does not exist in the ability information management table, the processing proceeds to S805. In S805, the CPU 203 adds the ability information in the ability information management table while being associated with the used plug-in (herein, the plug-in A 303) on the basis of the printing system 302. That is, the setting values included in the ability information obtained in S803 which can be set with respect to the print setting items such as "sheet size" and "sheet type" and also supported by the plug-in are added to the ability information management table. On the other hand, in S804, in a case where it is determined that the ability information obtained in S803 already exists in the ability information management table, the processing in S805 is skipped.

The above-described processing illustrated in S803 to S805 which is executed by using the plug-in A 303 is repeatedly executed by using both the plug-in B 304 and the plug in C 305 corresponding to the other plug-ins specified in S801. The ability information management table illustrated in FIG. 8B is created by the processing. It should be noted that, in a case where the ability information management table is newly created in a state in which the ability information management table is already stored, overwriting with respect to the already stored ability information management table is performed.

When the user selects the printer on the screen illustrated in FIG. 4C, the ability information management table is created in the RAM 205 by the above-described processing illustrated in FIG. 8A, and also the display of the display unit 208 returns to the processing illustrated in FIG. 4B. It should be noted that, at this time, the plug-in icon 402 of the plug-in selected by the user on the screen illustrated in FIG. 4C is displayed on the screen illustrated in FIG. 4B.

Figure 9A:
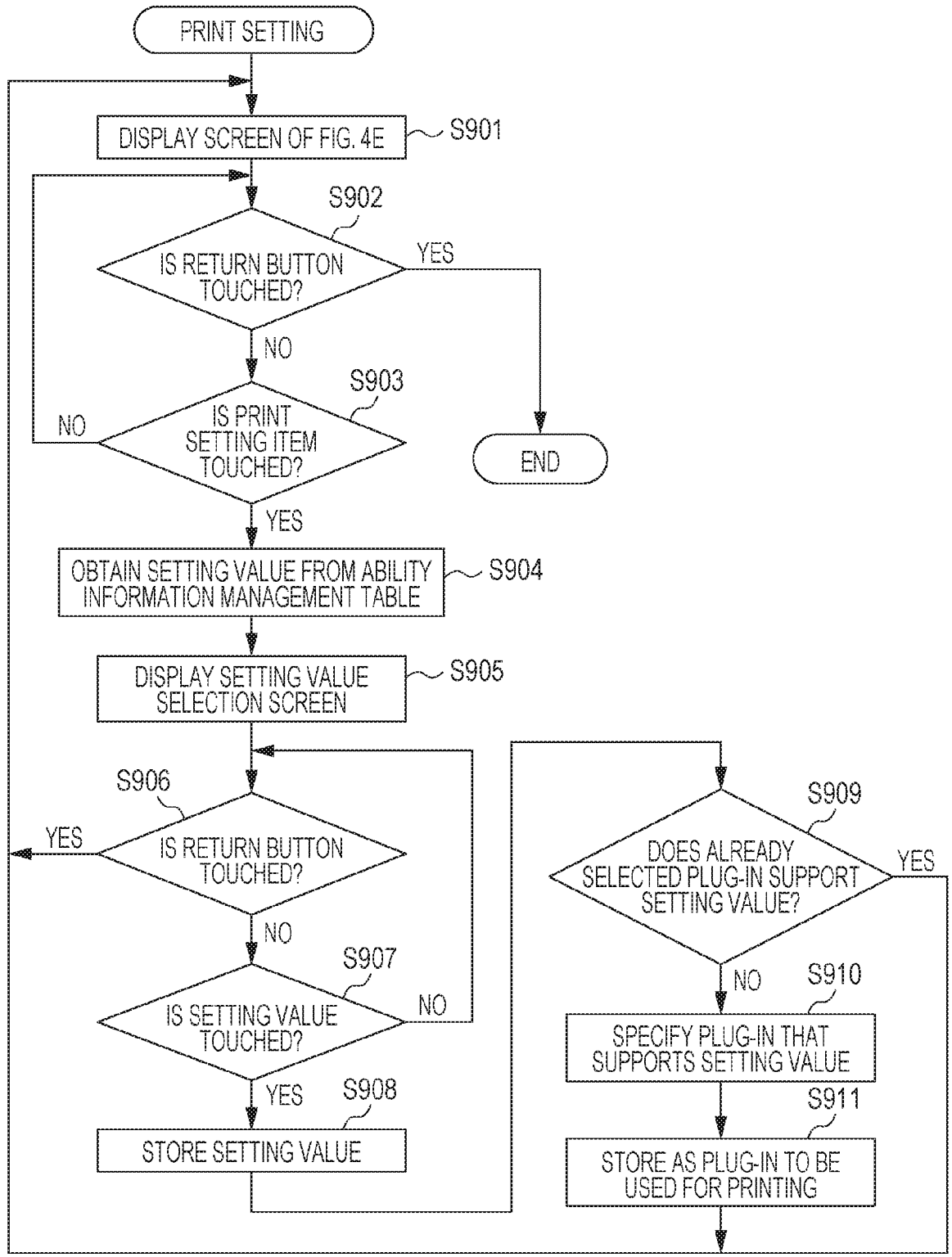
FIGS. 9A and 9B are explanatory diagrams for describing print setting processing according to the present exemplary embodiment.
Figure 9B:
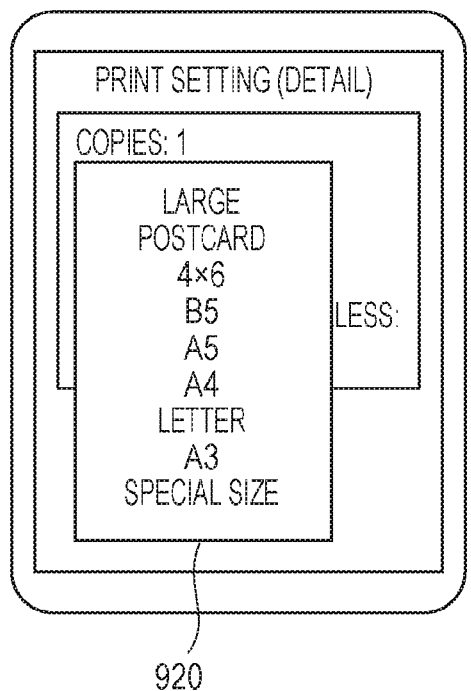

FIGS. 9A and 9B are explanatory diagrams for describing print setting processing according to the present exemplary embodiment. It should be noted that the processing illustrated in FIG. 9A is realized when the printing system 302 corresponding to part of the OS stored in the ROM 204 is executed by the CPU 203 while the RAM 205 is used as the work memory. The processing illustrated in FIG. 9A is started when the print setting 404 is touched on the screen illustrated in FIG. 4B.

In S901, the CPU 203 displays the screen illustrated in FIG. 4E on the basis of the printing system 302. In S902, the CPU 203 determines whether or not a return button which is not illustrated on the screen of FIG. 4E is touched on the basis of the printing system 302. When the return button is not touched, the processing proceeds to S903. In S903, the CPU 203 determines whether or not one of the plurality of print setting items included on the screen of FIG. 4E is touched on the basis of the printing system 302. When it is determined that the print setting item is touched, the processing proceeds to S904.

In S904, the CPU 203 obtains the setting values relevant to the touched print setting item from the ability information management table on the basis of the printing system 302. For example, in a case where the print setting item "sheet size" is touched, the setting values of the sheet sizes respectively corresponding to the plurality of plug-ins A to C in FIG. 8B are obtained. Next, in S905, the CPU 203 displays a screen for selecting a setting value desired by the user from the setting values obtained in S904 on the basis of the printing system 302. At this time, all the setting values obtained in S904 are displayed as selection candidates without duplications. In addition, even in the case of the setting value that is not supposed by all of the plurality of plug-ins A to C, when the setting value is supported by one of the plug-ins, the setting value is displayed as the selection candidate. In S905, for example, the screen illustrated in FIG. 9B is displayed. In FIG. 9B, the "special size" that is supported by only the plug-in B 304 among the plug-ins A to C is included as the selection candidate.

In S906, the CPU 203 determines whether or not the return button which is not illustrated in the drawing which is included on the screen displayed in S905 is touched on the basis of the printing system 302. When it is determined that the return button is touched, the processing returns to S901. When the return button is not touched, the processing proceeds to S907. In S906, the CPU 203 determines whether or not one of the plurality of setting values included on the screen displayed in S905 is touched on the basis of the printing system 302. When it is determined that one of the setting value is touched, the processing proceeds to S908.

In S908, the CPU 203 stores the setting value selected by the user in the predetermined storage area of the RAM 205 on the basis of the printing system 302. Specifically, the current setting value corresponding to the respective print setting items is regularly stored in the predetermined storage area of the RAM 205. In S908, the setting value corresponding to the print setting item selected in S903 is overwritten by the setting value selected in S907.

In S909, the CPU 203 refers to the ability information management table and determines in S907 whether or not the selected setting value is supported by the plug-in currently selected as the plug-in used for the printing on the basis of the printing system 302. For example, it is assumed that the plug-in A 303 in the highest rank on the screen of FIG. 4C is selected, and a sheet size "Large" is selected in S907. At this time, as illustrated in FIG. 8B, since "Large" is supported by the plug-in A 303, as a result of the determination in S909, the processing returns to S901.

On the other hand, for example, it is assumed that the plug-in A 303 in the highest rank on the screen of FIG. 4C, and the "special size" is touched in S907. At this time, as illustrated in FIG. 8B, the "special size" is not supported by the plug-in A 303. For this reason, as the result of the determination in S909, the processing proceeds to S910. In S910, the CPU 203 refers to the ability information management table and specifies the plug-in that supports the selected setting value in S907 on the basis of the printing system 302. In the above-described example, as illustrated in FIG. 8B, since the "special size" is supported by only the plug-in B 304, in S910, the plug-in B 304 is specified. It should be noted that, in a case where a plurality of plug-ins is specified in S910, one of the plug-ins may be specified depending on the predetermined priority levels. Alternatively, in S910, a screen for the user to select the plug-in may be displayed, and the plug-in selected by the user may be specified on the screen.

In S911, the CPU 203 stores the plug-in specified in S910 as the plug-in used for the printing in the above-described predetermined storage area of the RAM 205 on the basis of the printing system 302. Specifically, the plug-in information indicating the plug-in used for the printing is regularly stored in the above-described predetermined storage area of the RAM 205. In S911, the plug-in information is overwritten by the information indicating the plug-in specified in S910. Then, the processing returns to S901.

In S902 described above, in a case where it is determined that the return button which is not illustrated in the drawing which is included on the screen of FIG. 4E is touched, the processing illustrated in FIG. 9A is ended. When the processing illustrated in FIG. 9A is ended, the display unit 208 displays the screen illustrated in FIG. 4B. In FIG. 4B, the plug-in icon 402 indicating the plug-in used for the printing is displayed on the basis of the above-described plug-in information.

The user designates the setting value in S907 by the processing illustrated in FIG. 9A, and it is assumed that the setting value is not supported by the currently selected plug-in (S909: No). In this case, the plug-in used for the printing is automatically changed to the plug-in that supports the setting value (S909 to S911). Therefore, it is possible to easily select the appropriate plug-in in accordance with the set value of the print setting designated by the user.

Figure 10:
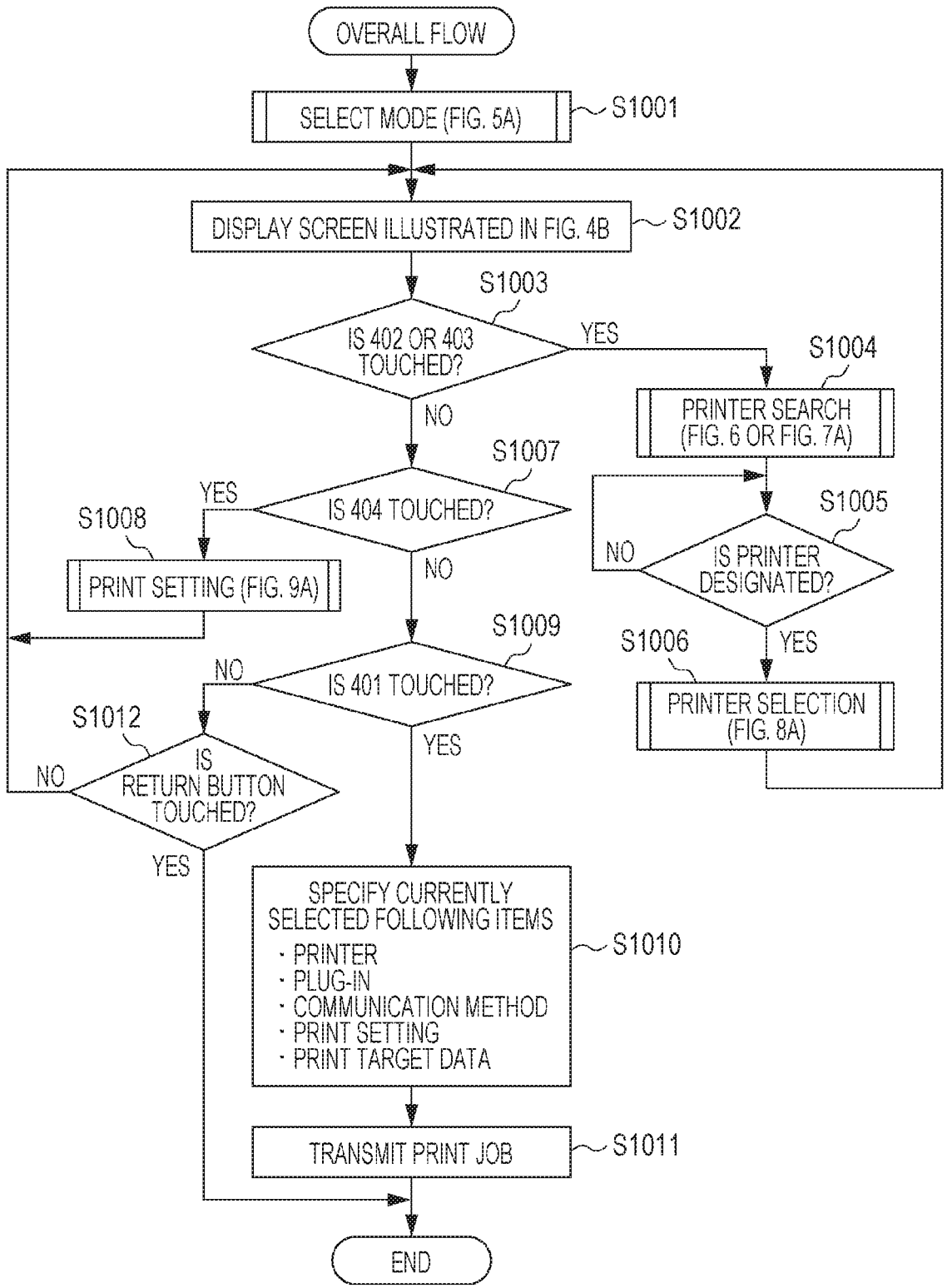
FIG. 10 illustrates an example of an overall flow according to the present exemplary embodiment.

Next, the entirety of the processing described with reference to FIGS. 4A to 4F to FIGS. 9A and 9B will be described. FIG. 10 illustrates an example of the overall flow according to the present exemplary embodiment. It should be noted that the processing illustrated in FIG. 10 is realized when the printing system 302 corresponding to part of the OS stored in the ROM 204 and the plug-ins A to C is executed by the CPU 203 while the RAM 205 is used as the work memory. The processing illustrated in FIG. 10 is started when the print button 400 is touched on the screen illustrated in FIG. 4A.

In S1001, the CPU 203 executes the processing illustrated in FIG. 5A to perform the display of the screen illustrated in FIG. 5B and the mode selection on the basis of the printing system 302. In S1002, the CPU 203 performs the display of the screen illustrated in FIG. 4B on the basis of the printing system 302. It should be noted that the printer, the plug-in, the communication method, and the print setting used for the printing at this time are selected, and the ability information management table corresponding to the printer is stored in the RAM 205. For example, the printer, the plug-in, the communication method, and the print setting which are used in the latest printing are selected, the ability information management table created when the printer is selected is stored in the RAM 205. When the processing illustrated in FIG. 10 is executed for the first time, for example, the predetermined plug-in, the communication method, and the print setting may be selected, an, the processing equivalent to S1004 to S1006 which will be described below may be executed after the processing in S1001 before the processing in S1002.

In S1003, the CPU 203 determines whether or not the plug-in icon 402 or the printer name 403 included on the screen illustrated in FIG. 4B is touched on the basis of the printing system 302. When the plug-in icon 402 or the printer name 403 is touched, the processing proceeds to S1004. In S1004, when the CPU 203 executes the processing illustrated in FIG. 6 or FIG. 7A, the display of the printer search and the printer list in accordance with the mode selected in S1001 is performed. With this configuration, as illustrated in FIG. 4C and FIG. 4D, the printer list is displayed by the display method in accordance with the mode selected by the user. Alternatively, as illustrated in FIG. 7B and FIG. 7C, the printer list is displayed while the plug-in in accordance with the mode selected by the user is set as the selection candidate.

Next, in S1005, the CPU 203 determines whether or not the printer is designated on the basis of the printing system 302 when the option is touched by the user in the printer list. When the printer is designated, in S1006, the CPU 203 performs the printer selection processing illustrated in FIG. 8A and also creates the ability information management table of the selected printer. Thereafter, the processing returns to S1002, but at this time, the printer name 403 of the printer selected in FIGS. 8A and 8B is displayed on the screen illustrated in FIG. 4B.

On the other hand, in S1003, when it is determined that the plug-in icon 402 or the printer name 403 is not touched, the processing proceeds to S1007. In S1007, the CPU 203 determines whether or not the print setting 404 in FIG. 4B is touched on the basis of the printing system 302. When the print setting 404 is touched, the CPU 203 executes the print setting processing illustrated in FIG. 9A in S1008. In particular, the plug-in used for the printing is automatically changed to the plug-in in accordance with the set value of the print setting designated by the user by the processing in S909 to S911 in FIGS. 9A and 9B.

In S1007, when it is determined that the print setting 404 is not touched, in S1009, the CPU 203 determines whether or not the print instruction button 401 in FIG. 4B is touched on the basis of the printing system 302. When the print instruction button 401 is touched, in S1010, the CPU 203 specifies the printer, the plug-in, the communication method, the print setting, and the data of the print target which are currently selected to be used for the printing on the basis of the printing system 302. Next, in S1011, the CPU 203 executes the print control unit of the plug-in specified in S1010 to generate the print job including the data of the print target and the print setting specified in S1010. Then, the printer is caused to perform the printing by transmitting the print job to the printer specified in S1010 via the communication unit 209 in accordance with the communication method specified in S1010. Thereafter, the processing illustrated in FIG. 10 is ended, and the screen illustrated in FIG. 4A is displayed on the display unit 208.

In S1009, when it is determined that the print instruction button 401 in FIG. 4B is not touched, the CPU 203 determines in S1012 whether or not the return button which is not illustrated in the drawing is touched in FIG. 4B. When the return button is touched, the processing illustrated in FIG. 10 is ended, the screen illustrated in FIG. 4A is displayed on the display unit 208. On the other hand, when the return button is not touched, the processing returns to S1002.

It should be noted that only the sheet size among the sheet size and the sheet type includes the plug-in specific setting value in the ability information management table illustrated in FIG. 8B. However, the configuration is not limited to this, and it is also conceivable that both the sheet size and the sheet type include the plug-in specific setting value.

FIG. 11 illustrates another example of the ability information management table. In FIG. 11, a special size 1 and a special type 1 are supported by only the plug-in B 304, and a special size 2 and a special type 2 are supported by only the plug-in C 305.

At this time, when the sheet size is selected as the print setting item on the screen illustrated in FIG. 4E, the special size 1 and the special size 2 are displayed as the selection candidates on the selection screen for the sheet size as illustrated in FIG. 4F. When it is supposed that the special size 1 is selected, the plug-in B 304 is selected as the plug-in used for the printing by the processing in S909 to S911 in FIGS. 9A and 9B.

However, when the user thereafter selects the sheet type as the print setting item on the screen illustrated in FIG. 4E, the special type 1 and the special type 2 are displayed as the selection candidates on the selection screen for the sheet type. At this time, when the user selects the special type 2, the plug-in C 305 is selected as the plug-in used for the printing by the processing in S909 to S911 in FIGS. 9A and 9B. Since the plug in C 305 does not support the thus selected special size 1, an error may occur in the printing in some cases.

In view of the above, when a plurality of selection candidates as setting values of a certain print setting item are displayed, the CPU 203 refers to setting values that are set with respect to another print setting item and the ability information management table. The CPU 203 then displays the selection candidates of the setting values such that the setting values where the plug-in relevant to a combination of the setting values in the plurality of print setting items does not exist are not set as the selection candidates. In the above-described example, when the user selects the special size 1 as the setting value of the sheet size, the CPU 203 thereafter performs display control such that the special size 2 is not to be displayed when the selection candidate of the setting value of the sheet type is displayed.

Alternatively, when a setting value of a certain print setting item is selected by the user, the CPU 203 may also refer to the setting values set with regard to the other print setting item and the ability information management table. In a case where the plug-in relevant to the combination of the setting values does not exist in the plurality of print setting items, the CPU 203 may also display an error screen on the display unit 208. At this time, for example, a setting value corresponding to a cause of the error such as "a plug-in that supports the sheet size: the special size 1, the sheet type: the special type 2 does not exist" may be displayed. With this configuration, the user can be urged to change the setting value of the sheet size or the setting value of the sheet type.

It should be noted that, according to the above-described exemplary embodiments, the mode selection illustrated in FIGS. 5A and 5B is executed before the printer search in S603 or S606 in FIG. 6. However, the configuration is not limited to this, and the printer search in S603 may be executed before the mode selection, and the mode selection may be performed during the printer search or after the printer search. For example, the CPU 203 may determine whether or not the same printer is detected by the plurality of plug-ins or the plurality of communication methods during the printer search or after the printer search. At a point in time when it is determined that the same printer is detected by the plurality of plug-ins or the plurality of communication methods, the CPU 203 may execute the processing illustrated in FIG. 5A, and the screen illustrated in FIG. 5B may be displayed. It should be noted that, when the processing illustrated in FIG. 5A is performed during the printer search, the printer search may be interrupted or executed in parallel. In either case, the list corresponding to the selected mode among the list illustrated in FIG. 4C and the list illustrated in FIG. 4D is displayed in accordance with the mode selected in the processing illustrated in FIG. 5A.

It should be noted that, according to the above-described exemplary embodiments, the control in which the data of the print target and the print setting are transmitted to the printer, and the printing in accordance with the print setting is executed has been described. However, the configuration is not limited to this, and control may be performed such that the data of the display target and the display setting are transmitted to the display device, and the display in accordance with the display setting is executed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer nay comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-078710 filed Apr. 16, 2018, which is hereby incorporated by reference herein in its entirety.

What is claimed is:

1. An information processing apparatus that searches for a printing apparatus via a network using printing software for causing the printing apparatus to print an image, the information processing apparatus comprising:
   a memory which stores a program;
   at least one processor which executes the program stored in the memory,
   wherein the at least one processor performs,
   searching for the printing apparatus by using both first printing software and second printing software,
   obtaining specification information for a user to specify the printing apparatus, in a case where the printing apparatus is detected by the first printing software or the second printing software in the searching,
   displaying the obtained specification information and predetermined information which indicates printing software used for the obtaining from among the first printing software and the second printing software, in association with each other,
   selecting a display method, from a plurality of display methods for displaying the obtained specification information and the predetermined information, in accordance with an instruction by the user,
   wherein in the displaying, the obtained specification information and the predetermined information are displayed by the selected display method, and
   determining, in a case where the same specification information is obtained by the first printing software and the second printing software, printing software used for printing by the printing apparatus among the first printing software and the second printing software, in accordance with an instruction by the user on the display by the selected display method,
   wherein the plurality of display methods includes,
   a first display method by which the same specification information and the predetermined information indicating the first printing software are displayed and the same specification information and the predetermined information indicating the second printing software are also displayed, and
   a second display method by which the same specification information and the predetermined information of one of the first printing software and the second printing software are displayed without displaying the same specification information redundantly.

2. The information processing apparatus according to claim 1, wherein in the obtaining, identification information for the information processing apparatus to identify the printing apparatus is further obtained, and
   wherein the at least one processor performs determining whether or not the same specification information is obtained by the first printing software and the second printing software, based on the identification information.

3. The information processing apparatus according to claim 1, wherein the at least one processor causes the printing apparatus to execute printing in accordance with a selected print setting, by using the determined printing software.

4. The information processing apparatus according to claim 3, wherein a setting item related to the selected print setting is a sheet size or a sheet type.

5. The information processing apparatus according to claim 1,
   wherein the printing software is a printing plug-in which is installed into a printing system of an OS (Operating System) in a form of add-in.

6. The information processing apparatus according to claim 3, wherein in the determining, the printing software is determined such that the selected print setting is included in print settings supported by the printing software.

7. The information processing apparatus according to claim 1,
   wherein in the searching, the printing apparatus is searched for by using a first communication method and a second communication method, and
   wherein in the displaying, the same specification information, the predetermined information, and information indicating a communication method by which the printing apparatus is detected, are displayed.

8. The information processing apparatus according to claim 1, wherein the at least one processor further obtains capability information indicating print settings which can be designated to the printing apparatus, from the printing apparatus, and
   wherein in the selecting, the selected print setting is selected from the print settings indicated by the capability information.

9. A non-transitory computer readable storage medium that stores a program executed by an information processing apparatus that searches for a printing apparatus via a network using printing software for causing the printing apparatus to print an image,
   the program, when executed, causing the information processing apparatus to perform the following functions:
   searching for the printing apparatus by using both first printing software and second printing software;

obtaining specification information for a user to specify the printing apparatus, in a case where the printing apparatus is detected by the first printing software or the second printing software in the searching;

displaying the obtained specification information and predetermined information which indicates printing software used for the obtaining from among the first printing software and the second printing software, in association with each other;

selecting a display method, from a plurality of display methods for displaying the obtained specification information and the predetermined information, in accordance with an instruction by the user, wherein in the displaying, the obtained specification information and the predetermined information are displayed by the selected display method; and determining, in a case where the same specification information is obtained by the first printing software and the second printing software, printing software used for printing by the printing apparatus among the first printing software and the second printing software, in accordance with an instruction by the user on the display by the selected-display method, wherein the plurality of display methods includes, a first display method by which the same specification information and the predetermined information indicating the first printing software are displayed and the same specification information and the predetermined information indicating the second printing software are also displayed, and a second display method by which the same specification information and the predetermined information of one of the first printing software and the second printing software are displayed without displaying the same specification information redundantly.

10. A control method executed by an information processing apparatus that searches for a printing apparatus via a network using printing software for causing the printing apparatus to print an image, the control method comprising:

searching for the printing apparatus by using both first printing software and second printing software;

obtaining specification information for a user to specify the printing apparatus, in a case where the printing apparatus is detected by the first printing software or the second printing software in the searching;

displaying the obtained specification information and predetermined information which indicates printing software used for the obtaining from among the first printing software and the second printing software, in association with each other;

selecting a display method, from a plurality of display methods for displaying the obtained specification information and the predetermined information, in accordance with an instruction by the user, wherein in the displaying, the obtained specification information and the predetermined information are displayed by the selected display method; and determining, in a case where the same specification information is obtained by the first printing software and the second printing software, printing software used for printing by the printing apparatus among the first printing software and the second printing software, in accordance with an instruction by the user on the display by the selected display method, wherein the plurality of display methods includes, a first display method by which the same specification information and the predetermined information indicating the first printing software are displayed and the same specification information and the predetermined information indicating the second printing software are also displayed, and a second display method by which the same specification information and the predetermined information of one of the first printing software and the second printing software are displayed without displaying the same specification information redundantly.

11. The control method according to claim 10, wherein in the obtaining, identification information for the information processing apparatus to identify the printing apparatus is further obtained, and wherein the control method further comprises determining whether or not the same specification information is obtained by the first printing software and the second printing software, based on the identification information.

12. The control method according to claim 10, wherein the at least one processor causes the printing apparatus to execute printing in accordance with a selected print setting, by using the determined printing software.

13. The control method according to claim 12, wherein in the determining, the printing software is determined such that the selected print setting is included in print settings supported by the printing software.

14. The control method according to claim 10, wherein the printing software is a printing plug-in which is installed into a printing system of an OS (Operating System) in a form of add-in.

15. The control method according to claim 10, wherein in the searching, the printing apparatus is searched for by using a first communication method and a second communication method, and wherein in the displaying, the same specification information, the predetermined information, and information indicating a communication method by which the printing apparatus is detected, are displayed.

* * * * *